United States Patent Office 3,347,867
Patented Oct. 17, 1967

3,347,867
CATALYTIC PROCESS FOR THE PREPARATION
OF VICINAL EPISULFIDES
Stephen W. Osborn, Yardley, and Edward Broderick, Perkasie, Pa., and José L. Villa, Cream Ridge, N.J., assignors to Thiokol Chemical Corporation, Bristol, Pa., a corporation of Delaware
No Drawing. Filed Mar. 4, 1965, Ser. No. 437,261
29 Claims. (Cl. 260—327)

ABSTRACT OF THE DISCLOSURE

Alkylene sulfides are prepared by reacting the corresponding alkylene oxide with a sulfur donating compound in the presence of, as a catalyst, at least one metallic halide selected from alkali metal halides and alkaline-earth metal halides.

---

This application is a continuation-in-part of our copending application S.N. 370,331, filed May 26, 1964.

This invention relates to a process for the preparation of vicinal episulfides and more particularly relates to such a process which involves the vapor phase reaction of an alkylene oxide with certain sulfur donating compounds using certain alkali metal and alkaline-earth halides as catalysts.

Vicinal monoepisulfides are a class of heterocyclic sulfur-containing compounds which may be represented by the structure

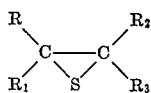

wherein R, $R_1$, $R_2$ and $R_3$ may be the same or different and may be H, an aryl group, or a lower linear or cyclic alkyl radical containing 1 to about 10 carbon atoms. These materials are also commonly referred to as alkylene sulfides. Examples of such compounds include monomeric materials such as ethylene sulfide, propylene sulfide, 1,2 and 2,3-butylene sulfide, isobutylene sulfide, styrene sulfide and cyclohexene sulfide. These compounds may be polymerized to form moldable thermoplastic polymers which are useful in a variety of molded articles such as pipe, O-rings, gears and the like. See in this regard S.N. 165,034 filed Jan. 8, 1962, S.N. 168,836 filed Jan. 25, 1962, and S.N. 274,866 filed Apr. 22, 1963, the latter two now abandoned, in the names of Riad H. Gobran and Stephen W. Osborn. Furthermore, certain of these vicinal episulfides exhibit utility without further structural modifications, as insecticides and fungicides. See in this regard U.S. 2,225,573.

Durden, et al., in the Journal of Organic Chemistry, 26, 836 (1961), report the preparation of ethylene sulfide and propylene sulfide by reacting the corresponding vic-epoxide analogs, i.e., ethylene oxide and propylene oxide, with carbonyl sulfide in a vapor phase reaction in the presence of a lithium phosphate catalyst.

The object of the present invention is to provide a novel process for the preparation of vicinal monoepisulfide compounds.

It has now been unexpectedly found that certain alkali-metal and alkaline-earth metal halides are effective as catalysts in the preparation of vicinal monoepisulfides in the reaction between the corresponding alkylene oxide and certain sulfur containing compounds. Specific catalysts which may be used according to the present invention include the halides of lithium, sodium, potassium, rubidium, cesium, beryllium, magnesium, calcium, strontium and barium.

The preferred catalyst of the above disclosed class of compounds is sodium fluoride which may be utilized directly in a particulate form or, if process conditions, such as gas reactant flow warrants, in a pelletized form. Furthermore, if the use of a high surface area per unit weight of catalyst is desired, the sodium fluoride may be prepared by initially pelletizing sodium bifluoride, $NaHF_2$, and heating the pellets to drive off HF, which process results in a somewhat porous type of sodium fluoride having an increased surface area of one to about three square meters per gram. Other methods of increasing the surface area of the catalyst, such as reducing the particle size, may also be employed.

Generally, the catalysts of the present invention are used in the form of pellets or spheres having a particle diameter of about 3/16″ although the shape and size may be varied as process conditions warrant. For practical, as well as economical reasons, mixtures of these halide catalysts may also be effectively utilized in accordance with the present invention. Such mixtures of these halides may comprise either a physical intermingling of discrete particles of the halides or a mounting or dispersion of one or more of the halides on the surface of a second particle or pellet as a support, which support may itself be a mixture of two or more of such halides. It is preferable that the reaction be conducted under relatively anhydrous conditions to avoid particle agglomeration and/or degradation of the reactants and products.

The alkylene oxides which may be used according to the present invention to form the analogous alkylene sulfides may be represented by the structure

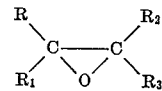

where R, $R_1$, $R_2$ and $R_3$ may be the same or different and may be H, an aryl group or a lower linear or cyclic alkyl group containing 1 to about 10 carbon atoms, depending on the desired alkylene sulfide product. Examples of such alkylene oxides are ethylene oxide, propylene oxide, 1,2- and 2,3-butylene oxide, isobutylene oxide, styrene oxide and cyclohexene oxide. Additionally, the alkylene oxide must be a gas, liquid or solid capable of being converted to the gaseous phase at the reaction temperature and pressure involved in the process.

The sulfur donating compound which is reacted with the alkylene oxide according to the present invention should be a material which is a sulfur donor under the reaction conditions employed in the present process. It should be a material which will exist in a vapor state at the reaction conditions employed in the process of the present invention. These sulfur donating materials may be organic or inorganic in nature and would include such materials as COS, $CS_2$, $H_2S$ and the vicinal monoepisulfide compounds described above. A vicinal monoepisulfide having a different number of carbon atoms may be used, according to the present invention, as a sulfur donating compound in the preparation of a vicinal monoepisulfide. For example, propylene sulfide may be used as a sulfur donating compound in the production of ethylene sulfide. A composition which is rich in one or more of such sulfur donating materials may be used as a source of the pure material itself. Refinery gases, natural gases, and coke oven gases, for example, which contain $H_2S$ may be used as a source of $H_2S$. The sulfur donating materials may be used alone or in combination with one another. The preferred of such sulfur donating materials is COS since, with it, the best yields and conversions are obtained, all other factors remaining the same.

Although the reaction will proceed when the mole ratio of sulfur donating compound to alkylene oxide is in the order of about 0.2:1 to 10:1, it is preferable that the ratio of sulfur donating compound to alkylene oxide be about 0.8:1 to 1.5:1. It is also preferable that an excess of sulfur donating compound, in respect to the amount of alkylene oxide being used, be utilized to prevent or reduce to a practical minimum the formation of alkylene oxide polymers since the predominating number of molecules of the sulfur donating compound will enhance or increase the possibility of reaction between such compounds and the alkylene oxide and correspondingly reduce the possibility of an epoxide polymerization reaction.

Since the reaction between the sulfur donating compound and the alkylene oxide preferably proceeds in the gaseous phase, certain reaction parameters, such as catalyst contact time, reactant gas volume and catalyst volume may be definitively considered in a single concept, i.e., space velocity. Those in the art usually define space velocity as the volume of combined reactant gases passing at standard temperature and pressure per unit time $$\left(\frac{-V}{t}\right)$$

through a given volume of catalyst space $(v_c)$, i.e., space velocity is equal to $$\left(\frac{V}{t}/v_c\right)$$

or $$\left(\frac{V}{v_c t}\right)$$

Time is usually expressed in hours or more exactly, reciprocal hours since $(t)$ appears in the denominator of the expression. In the present invention a space velocity of up to about 1500 volumes of combined reactant gases per volume of catalyst per hour may be utilized. Space velocity is more conveniently expressed as hours$^{-1}$. The preferable space velocity employed in the process of the present invention is from about 150 to about 500 hours$^{-1}$.

The halide catalysts of the present invention may be contacted with the reactants in a vapor or gaseous phase by any of the common gas/solid contacting techniques which are usually used by those in the art and which are usually classified in terms of the conditions in which the catalyst bed is employed. Thus, the catalyst bed may be described as being static, moving or fluidized. When employing a static or fixed bed technique, the catalysts are preferably used as pellets, spheres or granules having a particle diameter of about 1/8 inch to about 3/8 inch.

Atmospheric or autogenous pressures have been found to be satisfactory for the present process although reactor design factors and/or reactant vapor pressure considerations may influence this reaction parameter. It has been found that the reaction will proceed over a wide range of temperatures although a useful range of from about 50° C. to about 500° C. may be utilized advantageously and a temperature range of from about 175° C. to about 200° C. is preferable. When the temperature exceeds 500° C., the alkylene oxide reactant and alkylene sulfide product tend to interreact or polymerize and/or a general degradation of the compounds involved results.

The following examples are merely illustrative of the present invention and are not to be considered a limitation upon the scope thereof.

*Example 1*

An apparatus was set up comprising an electrically heated, glass reactor column equipped with a thermocouple well and a chamber for mixing the reactant gases prior to their being introduced into the column. Flow rate meters were coupled between the gas sources and the chamber for mixing the reactant gases in order to measure the gas reactant flow. A sample take-off was placed in the column and connected to a gas chromatograph in order to sample and analyze the emerging gases. The column was charged with sodium fluoride pellets having a 3/16" diameter and heated to a temperature of about 200° C. The reactant gases, carbonyl sulfide and ethylene oxide, were introduced into the reactor column in a mole ratio of about 1.2:1 and the flow rate of the reactants adjusted to give the system a space velocity of approximately 166 hours$^{-1}$. After one hour, a gas chromatographic analysis of the emerging gases indicated a 17.07% ethylene sulfide content or a 25.09 mole percent conversion of ethylene oxide to ethylene sulfide.

*Example 2*

The apparatus described in Example 1 was charged with sodium iodide pellets having a particle diameter of about 3/8 inch. The reaction parameters and reactant charge were the same as in Example 1. At the end of one hour a gas chromatographic analysis of the effluent indicated an ethylene sulfide concentration of 27.15% or a mole percent conversion of ethylene oxide to ethylene sulfide of 39.10%. The run was continued for 10 hours and at the end of this time an analysis of the effluent indicated a 38.75% ethylene sulfide content or a 55.36 mole percent conversion of ethylene oxide to ethylene sulfide.

*Example 3*

An apparatus as described in Example 1 was charged with 3/8 inch potassium chloride pellets. Reaction parameters and the reactant charge were the same as those outlined in Example 1. A gas chromatographic analysis of the effluent gas showed the presence of ethylene sulfide.

*Example 4*

An apparatus as described in Example 1 was charged with a catalyst comprising a 1:1 ratio of sodium fluoride and sodium chloride crystals formed into 3/4" pellets. The temperature of the reactor was raised to about 200° C. and the flow of the reactant gases, carbonyl sulfide and ethylene oxide, was adjusted to give the system a space velocity of approximately 166 hours$^{-1}$. The mole ratio of carbonyl sulfide to ethylene oxide was 1.2:1. After one hour, a gas chromatographic analysis of the emerging gases indicated a 16.01 mole percent conversion of ethylene oxide to ethylene sulfide.

*Example 5*

An apparatus as in Example 1 was charged with 3/8" lithium chloride pellets and the temperature of the system raised to about 200° C. The reactant gases, carbonyl sulfide and ethylene oxide, were introduced into the reactor column in a mole ratio of about 1.2:1 and the flow rate of the reactants adjusted to give the system a space velocity of approximately 166 hours$^{-1}$. After one hour, a gas chromatographic analysis of the effluent indicated a 6.08% concentration of ethylene sulfide or a 9.82 mole percent conversion of ethylene oxide to ethylene sulfide. After nine hours, a similar analysis indicated a 13.18% ethylene sulfide concentration or a 23.89 mole percent conversion of ethylene oxide to ethylene sulfide.

*Example 6*

An apparatus as in Example 1 was charged with potassium iodide crystals having a mesh size of 5 to 8. The temperature of the reactor and catalyst was raised to about 200° C. and the reactant gases, carbonyl sulfide and ethylene oxide, were introduced into the reactor column in a mole ratio of 1.2:1. The flow rate of the reactant gases was adjusted to give the system a space velocity of about 166 hours$^{-1}$. After about 1½ hours a gas chromatographic analysis of the effluent indicated an ethylene sulfide concentration of 19.45% or a mole percent conversion of ethylene oxide to ethylene sulfide of 20.56.

*Example 7*

An apparatus was set up as in Example 1 and charged with barium fluoride granules having a particle diameter of about 1/8". The temperature of the reactor and catalyst was raised to about 200° C. and the reactant gases, carbonyl sulfide and ethylene oxide, were introduced into the reactor in a mole ratio of 1.2:1. The flow rate of the reactants was adjusted to give the system a space velocity of 166 hours$^{-1}$. A gas chromatographic analysis of the effluent after one hour indicated an ethylene sulfide concentration of 7.08% or a mole percent conversion of ethylene oxide to ethylene sulfide of 9.60%.

*Example 8*

An apparatus as in Example 1 was set up and charged with sodium fluoride pellets having a particle diameter of approximately 1/8″. Carbonyl sulfide and propylene oxide, in a mole ratio of 2:1, were introduced into the reactor, which was previously preheated to a temperature of 250° C. The flow rate of the reactants was adjusted to give the system a space velocity of about 150 hours$^{-1}$. A gas chromatographic analysis of the emerging gases indicated the presence of propylene sulfide.

*Example 9*

This example demonstrates an embodiment of the present invention which comprises combining a mixture of halides with a means for increasing the surface area of the catalyst. An apparatus as in Example 1 was charged with a catalyst prepared by mixing 10% (weight/weight) of sodium bifluoride with sodium chloride crystals, pelletizing the mixture into 3/8″ pellets, and heating the pellets by raising the temperature gradually to 400° C. over a period of two hours and maintaining the temperature at 400° for an additional 6 hours to drive off HF and leave an admixture of NaCl and NaF having an increased surface area. The reactor was then heated to 200° C. and ethylene oxide and carbonyl sulfide, in a mole ratio of 1.2:1, were introduced into the reactor. The flow rate of the reactants was adjusted to give the system a space velocity of 166 hours$^{-1}$. A gas chromatographic analysis of the effluent after 1½ hours indicated a 22.01% ethylene sulfide concentration or a 27.17 mole percent conversion of ethylene oxide to ethylene sulfide.

*Example 10*

An apparatus as used in Example 1 was used in the present experiment. The glass reactor column was 17 inches in height and 20 mm. in diameter. Sodium fluoride pellets, 1/8″ in diameter, were used to form a six inch deep catalyst bed in the reactor. The column and its contents were heated to between 300 and 400° C. The ethylene oxide gas was first bubbled through a heated liquid carbon disulfide so as to obtain the carbon disulfide in the gaseous state. Carbon disulfide and ethylene oxide were then concurrently metered through the heated column for four and a half hours at various temperatures. The flow rate of ethylene oxide was 126 CC./min. The composition of the exiting gases varied during the 4½ reaction period as indicated by a chromatographic analysis of such gases. The reaction temperatures employed and the composition of the exiting gases obtained during the various portions of the 4½ hour reaction period are shown in Table 1 below.

TABLE 1

| Portion of 4½ Hr. Reaction Period | Temp. Employed, °C. | Composition of Exiting Gases, Percent | | | | | Mole Percent Conversion |
|---|---|---|---|---|---|---|---|
| | | CO$_2$ | COS | EO[1] | CS$_2$ | ES[2] | |
| 1st hour | 300 | | | 48.81 | 50.66 | 0.51 | 0.76 |
| 2d hour | 350 | 0.09 | | 47.74 | 50.41 | 1.74 | 2.60 |
| 3d hour | 400 | 0.43 | 0.46 | 41.73 | | 10.10 | 15.09 |
| Last 1½ hours | 400 | 0.43 | 0.46 | 41.72 | 48.59 | 4.69 | 6.91 |

[1] EO=Ethylene oxide.
[2] ES=Ethylene sulfide.

*Example 11*

An apparatus was set up as in Example 1 and charged with sodium fluoride having a particle diameter of about 1/8″. The temperature of the reactor and catalyst was raised to about 200° C. and H$_2$S was then continuously passed through the column (at 200° C.) and after approximately ½ hour the exit gases were chromatographically analysed. No decomposition or any product formation was obtained from the H$_2$S. Ethylene oxide was then incorporated in the incoming H$_2$S stream. The hydrogen sulfide to ethylene oxide mole ratio was 1.2:1 and the flow rate of the reactants was adjusted to give the system a space velocity of approximately 166 hours$^{-1}$. After one hour a gas chromatograph analysis of the emerging gases gave the following results: carbon dioxide (or carbonyl sulfide) 1.93%; hydrogen sulfide 50.96%; ethylene oxide 25.48%; ethylene sulfide 21.61% or a 38.3% mole conversion of ethylene oxide to ethylene sulfide.

*Example 12*

An apparatus for demonstrating a fluidized bed catalyst system was set up comprising a glass reactor column 10 inches in length and 1 inch in diameter equipped with a mixing chamber whereby the reactant gases, ethylene oxide and carbonyl sulfide, were mixed prior to being introduced into the column; a heating tape wrapped on the outside of the column, and a stirrer attached to a motor to aid in fluidizing the catalyst. (The stirrer was found to be useful due to the presence of a liquid by-product which was formed in the process which caused gumming up of the catalyst bed.) Flow rate meters were coupled between the gas sources and the mixing chamber to measure the gas reactant flow. The gas inlet tube was placed at the bottom of the column in such a way that the incoming reactant gases would be passed upward through the fluidized bed. At the top of the reactor column a gas outlet tube conducted the reacted gases to a gas chromatograph for analysis. The catalyst bed, 6 inches in length and 1 inch in diameter, was composed of finely ground calcium fluoride. The column temperature was raised to about 200° C. and the reactant gases were allowed to flow into the preheated reactor column. The mole ratio of COS to ethylene oxide was 1.2:1 and the flow rate of the reactants was adjusted to achieve a space velocity of about 166 hours$^{-1}$. A gas chromatographic analysis of the emerging gases gave the following results:

| Time | Percent CO$_2$ | Percent COS | Percent EO[1] | Percent ES[2] | Mole Percent Conversion |
|---|---|---|---|---|---|
| ½ hr | 26.8 | 49.2 | 16.5 | 6.88 | |
| 1 hr. 20 min | 12.3 | 43.1 | 33.5 | 11.0 | 19 |

[1] EO=Ethylene oxide.
[2] ES=Ethylene sulfide.

The reactor column had a weight increase of 16.7 grams at the end of the run.

*Example 13*

An apparatus as was used in Example 1 was used in the present experiment. Sodium fluoride pellets, 1/8″ in diameter, were used to form a 12-inch catalyst bed in the reactor. The reactor column was heated to a temperature of 200° C. A flask was added which contained propylene sulfide through which ethylene oxide was bubbled at the rate of 260 cc./min. before entering the reaction chamber. The effluent gases from the reactor as analyzed by gas chromatograph after 1½ hours were composed of ethylene oxide, propylene oxide, propylene sulfide and ethylene sulfide.

We claim:

1. A process for the preparation of at least one alkylene sulfide which comprises reacting at a temperature of from about 50° C. to 500° C., in the presence of, as a catalyst, at least one metallic halide selected from the group consisting of alkali metal halides and alkaline-earth metal halides, at least one alkylene oxide with at least one sulfur donating compound, at least one of said sulfur donating compounds being different from said alkylene sulfide, and, further, being a compound which exists in the vapor state under the above stated reaction conditions and which is capable of donating sulfur under such conditions.

2. A process as in claim 1 wherein said sulfur donating compound is selected from the group consisting of COS, $CS_2$, $H_2S$ and alkylene sulfide compounds.

3. A process as in claim 2 wherein said alkylene sulfide compounds have the structure

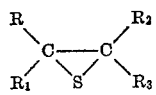

wherein R, $R_1$, $R_2$ and $R_3$ are selected from the group consisting of H, an aryl group, and a lower alkyl radical containing 1 to about 10 carbon atoms.

4. A process as in claim 2 wherein said sulfur donating compound is COS.

5. A process as in claim 2 wherein said sulfur donating compound is $CS_2$.

6. A process as in claim 2 wherein said sulfur donating compound is $H_2S$.

7. A process as in claim 3 wherein said sulfur donating compound is an alkylene sulfide.

8. A process as in claim 7 wherein said alkylene sulfide is propylene sulfide.

9. A process as in claim 1 wherein said reacting takes place while concurrently passing at least one of said alkylene oxides and at least one of said sulfur donating compounds as gases through said metallic halide catalyst in the form of a solid catalyst bed.

10. A process as in claim 9 wherein said metallic halide catalyst has a surface area of at least 1 sq. meter/gm.

11. A process as in claim 9 wherein said reacting takes place at a temperature of from about 50° C. to about 500° C.

12. A process as in claim 11 wherein said reacting takes place at a temperature of from about 100° C. to about 400° C.

13. A process as in claim 9 wherein said alkylene oxides and said sulfur donating compounds are passed through said catalyst bed at a space velocity of up to about 1500 reciprocal hours.

14. A process as in claim 13 wherein at least one of said alkylene oxides and at least one of said sulfur donating compounds are passed through said catalyst bed at a space velocity of from about 150 to 500 reciprocal hours.

15. A process as in claim 1 wherein said reacting takes place at autogenous pressures.

16. A process as in claim 1 wherein at least one of said metallic halides is an alkali metal halide.

17. A process as in claim 16 wherein said alkali metal halide is NaF.

18. A process as in claim 16 wherein said alkali metal halide is NaI.

19. A process as in claim 16 wherein said alkali metal halide is KCl.

20. A process as in claim 16 wherein said alkali metal halide is KI.

21. A process as in claim 16 wherein said alkali metal halide is KCl.

22. A process as in claim 1 wherein at least one of said metallic halides is an alkaline-earth metal halide.

23. A process as in claim 22 wherein said alkaline-earth metal halide is $BaF_2$.

24. A process as in claim 1 wherein said catalyst is a mixture of at least two of said alkali metal and alkaline earth metal halides.

25. A process as in claim 24 wherein said catalyst is a mixture of NaF and NaCl.

26. A process as in claim 1 wherein at least one of said alkylene oxides is ethylene oxide.

27. A process as in claim 1 wherein at least one of said alkylene oxides is propylene oxide.

28. A process as in claim 1 wherein at least one of said sulfur donating compounds and at least one of said alkylene oxides are used in a mole ratio of from about 0.2:1 to about 10:1, respectively.

29. A process as in claim 28 wherein said mole ratio is about 0.8:1 to 1.5:1, respectively.

References Cited

UNITED STATES PATENTS 3,213,108  10/1965  Osborn et al. _____ 260—327

JAMES A. PATTEN, *Primary Examiner.*

UNITED STATES PATENT OFFICE
CERTIFICATE OF CORRECTION

Patent No. 3,347,867                  October 17, 1967

Stephen W. Osborn et al.

It is hereby certified that error appears in the above numbered patent requiring correction and that the said Letters Patent should read as corrected below.

Column 2, line 28, for "reacants" read -- reactants --; column 5, line 54, for "126 CC./min." read -- 126 cc./min. --; column 8, line 23, for "KCl" read -- LiCl --.

Signed and sealed this 6th day of May 1969.

(SEAL)
Attest:

Edward M. Fletcher, Jr.

Attesting Officer

Commissioner of Patents